Oct. 23, 1962 A. E. PINET 3,060,268
SYSTEM FOR TRANSMITTING SPECIAL SIGNALS FOR
PULSE TYPE TELECOMMUNICATION SYSTEMS
Filed May 14, 1959 4 Sheets-Sheet 1

INVENTOR.
ANDRÉ EUGENE PINET
BY
C. A. Gulbrandsen
ATTY.

Oct. 23, 1962 A. E. PINET 3,060,268

SYSTEM FOR TRANSMITTING SPECIAL SIGNALS FOR PULSE TYPE TELECOMMUNICATION SYSTEMS

Filed May 14, 1959 4 Sheets-Sheet 2

Oct. 23, 1962 A. E. PINET 3,060,268

SYSTEM FOR TRANSMITTING SPECIAL SIGNALS FOR PULSE TYPE TELECOMMUNICATION SYSTEMS

Filed May 14, 1959 4 Sheets-Sheet 4

United States Patent Office 3,060,268
Patented Oct. 23, 1962

3,060,268

SYSTEM FOR TRANSMITTING SPECIAL SIGNALS FOR PULSE TYPE TELECOMMUNICATION SYSTEMS

André Eugène Pinet, St. Maur-des-Fosses, France, assignor to Automatic Electric Laboratories, Inc., a corporation of Delaware Filed May 14, 1959, Ser. No. 813,126
Claims priority, application France May 19, 1958
5 Claims. (Cl. 179—15)

The present invention relates to multiplex systems of electrical telecommunication employing time spaced pulses, and more particularly to a new method for transmitting in such systems, calling, supervision, dialing, off hook, and metering signals and the like, designated hereinafter under the general designation of control signals.

It is recalled that in such systems, the time of transmission is divided into a series of successive equal intervals. If the system comprises for example six channels, groups of seven successive time intervals are set up, and in each of these groups, the first interval is assigned to the transmission of a signal of a particular and invariable wave form, easily identifiable on reception and called the "synchronization signal," while each of the six succeeding intervals is assigned to a particular channel. The first interval of the second group is likewise assigned to a synchronization signal, and so on. Such a group of time intervals, including a single synchronization signal, and formed of a number of component intervals equal to the number of channels in the telecommunication system, plus one, will be called hereinafter a "cycle of operation" or "cycle." The inverse quantity to the duration of this cycle is equal to the frequency of recurrence of the pulses in a communication channel, and, to obtain a good quality of transmission, should be made considerably greater than the maximum useful frequency present in the information signals of this channel.

In known manner, the transmission of the information signal in each channel, a telephone conversation signal for example, is effected by transmitting at regular intervals, repeated at this frequency of recurrence, electrical pulses of short duration whose amplitude, or some other characteristic, is proportional to the instantaneous amplitude of the said information signal at the said instants. To simplify the explanation it will be assumed that the pulses being transmitted are modulated in amplitude. Amplitude modulation of pulses may, of course, by well known means, be transformed into some other desired type of pulse modulation.

The modulation in question is effected, for each channel, by an electrical device called a "channel modulator" controlled on the one hand by the voltage or the current of the information signal to be transmitted, and on the other hand by unmodulated periodic pulses repeated at the previously mentioned frequency of recurrence by a local pulse generator. These unmodulated pulses will be called hereinafter "sampling pulses." The modulator furnishes at its output modulated pulses which are applied to a communication circuit of any type for their transmission to a suitable receiver.

It is also known that in a telecommunication system of the type being considered, it is necessary to transmit, in addition to the information signals, call signals, supervision signals, metering signals, end of conversation signals etc., that is to say, control signals, and which may be transmitted either before or after the conversation signals, or even, for some of them, at the same time as the conversation signals. When it is desired to transmit control signals over one or several telecommunication channels, a voltage in an appropriate wave form is connected momentarily to the modulator or modulators of the corresponding channels from a special source, and the sampling pulses are thus modulated by this latter voltage in the same manner as by the conversation signals. A single such special source is, in general, common to all of the channels of a multiplex system.

It is also known that in multiplex links employing pulse modulation, particularly in multiplex links of this type where the pulses are modulated in amplitude, the control signals are generally transmitted by the signalling system known as "voice frequency" signalling. In that system a particular frequency $f$, selected from the voice frequency band, is assigned to the control signals. The special source for the said control signals is then simply a source of alternating current of frequency $f$. At the transmission end, this latter source, when it is activated, acts on each channel modulator in the same manner as the conversation signals. At the receiving end, a demodulated signal of $f$ frequency is obtained, which is separated from the voice frequency components corresponding to conversation signals, and utilized in a receiving unit especially adapted to the said control signals.

Such a voice frequency signalling system therefore requires a generator for the alternating current of frequency $f$. Furthermore, to avoid false operations of the control signal receiving unit, a first known method consists in removing from the conversation signals, at the transmission end, all of the components having a frequency equal to or close to the frequency $f$ assigned to the control signals. A second method consists in selecting the value of this control frequency $f$ at one of the extremities of the frequency band occupied by the conversation signals, since in general, at the said extremities, the levels of the components of the conversation signals do not have very high values.

The first of the foregoing methods has the inconvenience of reducing the utilizable band of frequencies transmitted for conversation, and in consequence, of reducing the quality of the telephonic connections. Furthermore, the elimination of the conversation signals of the same frequency $f$ as that of the control signal, requires the presence of expensive electric filtering networks in all of the communication channels involved.

The second of the foregoing methods consists in modulating the sampling pulses with the control signal of frequency $f$ with a very high modulation factor approximating 100%, since in effect the conversation signals may have relatively low level components of the same frequency $f$ as the control signal. Consequently, during the transmission of the control signal, no other signal of any frequency may be transmitted simultaneously, since, at the transmission end, the control signal under consideration, by itself modulates the pulses with a modulation factor close to 100%. It is evident that the simultaneous transmission of a control signal and some other signal such as a conversation signal, would cause a very heavy disturbance in the transmission of the said conversation signal by the production of a considerable amount of distortion.

This second method is therefore not suitable for certain types of telephone operation, as for example in cases where it is essential to provide the possibility of transmitting control signals and conversation signals simultaneously. This is the case on certain interurban or regional telephone circuits operated on an automatic basis, where it is necessary to transmit metering signals during the conversation.

According to the invention, there has been chosen as the signal to be impressed on the modulator for control purposes, a pulse of a frequency located above the voice frequency band, and having a frequency one half the frequency of recurrence of the sampling pulses, that is to say a frequency located above the frequency band of the conversation signals.

The result of this, with respect to the frequency selected for the control pulse, is that it is sampled in a channel modulator only twice for each cycle of operation. As will be seen subsequently, it is necessary in such a case, in order for the demodulated control pulse to have a well defined amplitude, that this pulse and the sampling pulses also have a well defined phase relation, so that the sampling pulses will be preferably produced at the maximum positive and negative amplitudes of the control pulses. Thus, if the control pulse were a sinusoidal signal, of a particular phase, this condition could be realized only for the sampling pulses of a single channel.

According to the invention, the control pulse employed for modulating the pulses of all of the channels is a periodic pulse in the form of a rectangular wave having a frequency equal to half of the frequency of recurrence of the channel sampling pulses. In addition, this same rectangular pulse is synchronized with respect to the synchronization pulses of the multiplex system in accordance with a phase relationship such that it goes positive during one period of recurrence of the channel pulses, and negative during the succeeding period of recurrence of these channel pulses.

At the receiving end, the component of the demodulated signal whose frequency is equal to half the frequency of recurrence of the pulses is separated from the voice frequency components belonging to the conversation signals by known methods.

In the control signalling system of the invention, the operation of the control pulse receiving unit by the conversation signals is not to be feared, due to the fact that, on the one hand, the components of the conversation signals having a frequency equal to half the frequency of recurrence of the impulses are very rare, and that, on the other hand, the said components can affect the control pulse receiving unit only in the case where, having a suitable phase relationship with the sampling pulses, they maintain such a relationship for a sufficiently long time. The probability of such an occurrence in telephone operations is practically nil.

The system of the invention therefore permits modulating the channel pulses by the control pulses with a modulation factor of low value, around 30%. It is therefore possible to transmit both control pulses and conversation signals simultaneously without inconvenience.

The invention will be better understood by reading the detailed description to follow and by examining the accompanying drawings in which.

Figure 4:
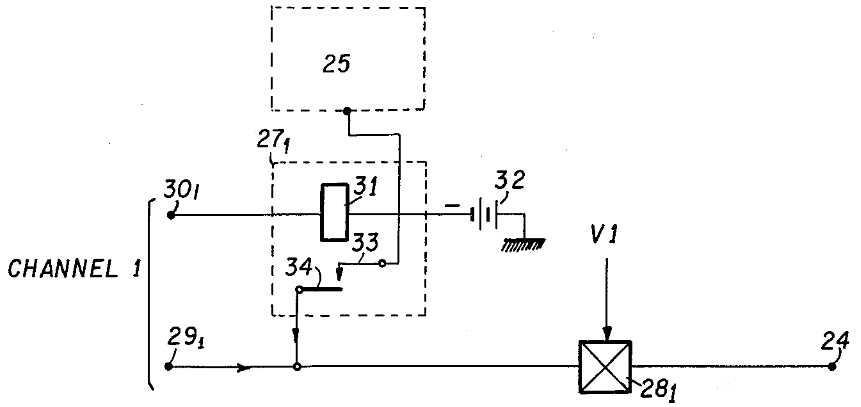
Figure 5:
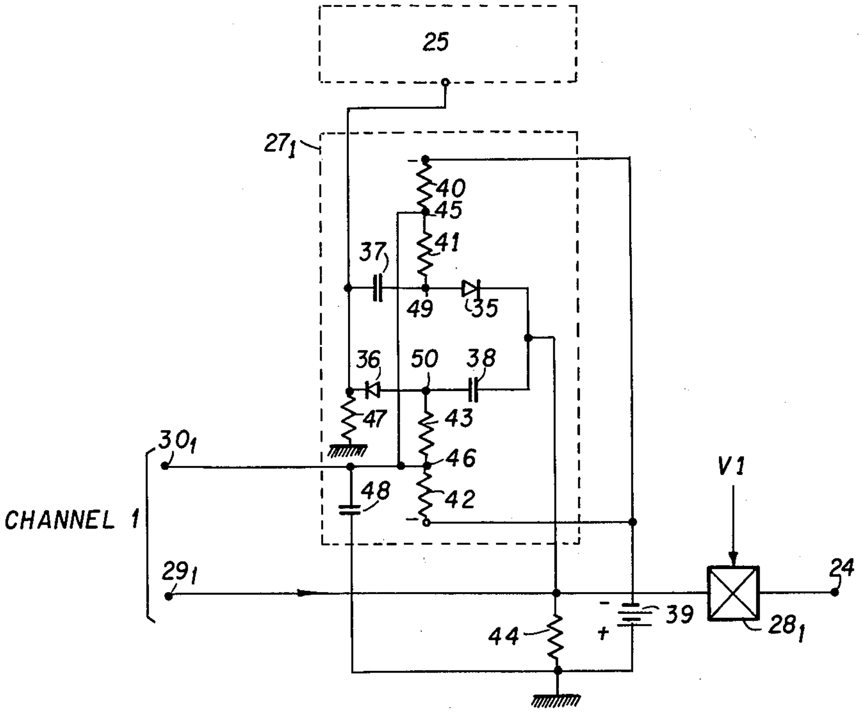
Figure 3:
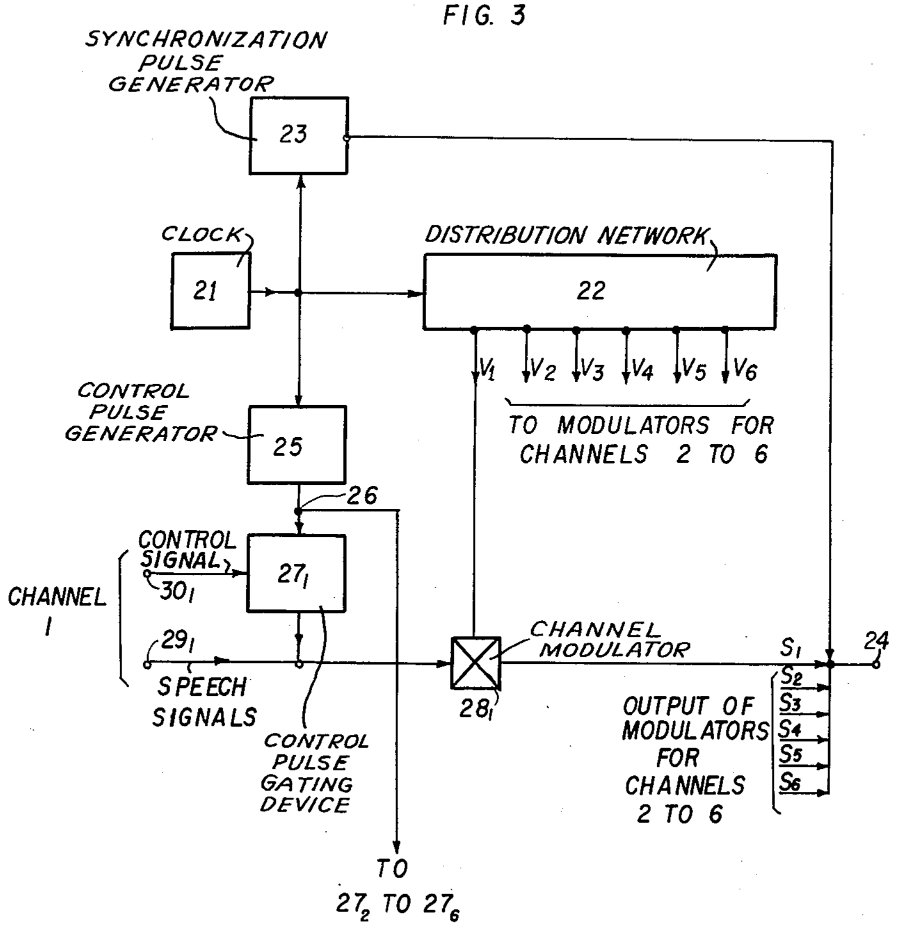

FIG. 3 gives the one line diagram, in block form, of a six channel multiplex transmission apparatus employing symmetrical pulse modulation in amplitude, utilizing the control signalling system of the invention;

FIG. 4 shows the schematic of a control pulse gating device according to the invention, employing an electromechanical relay;

FIG. 5 represents a second schematic of a control pulse gating device according to the invention, whose constituent parts are of the electronic type.

Figure 1:
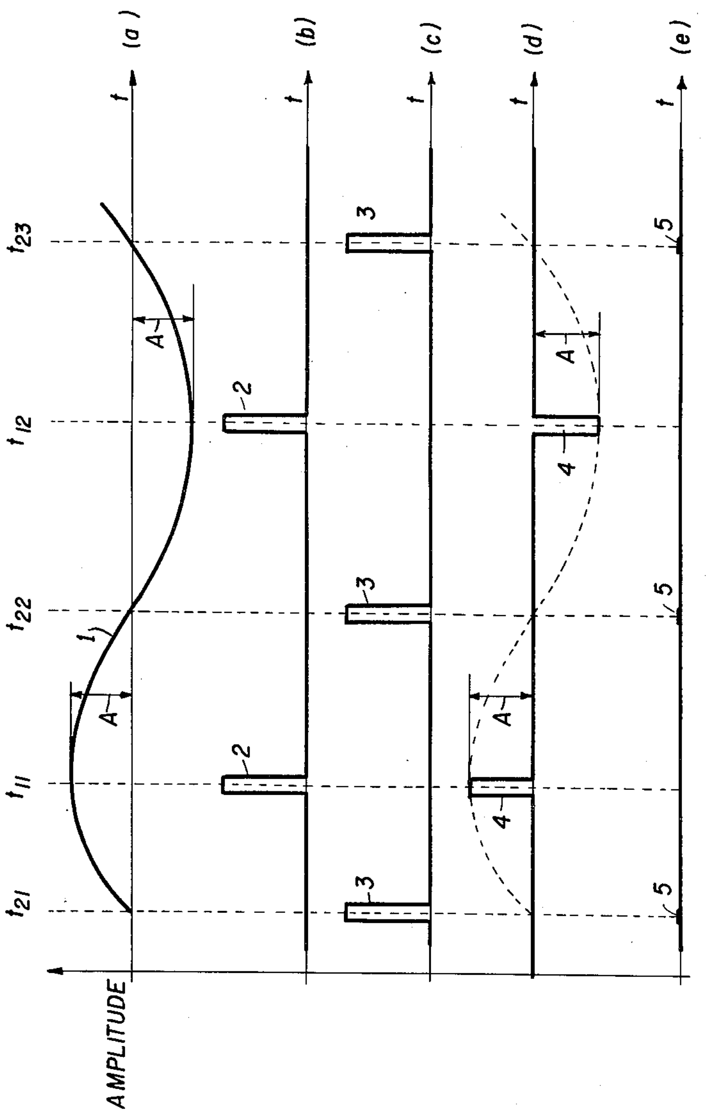
FIG. 1 is a diagram of signal wave shapes showing an information signal sampling operation, and a pulse modulation operation in the case where the alternating modulation signal has a frequency signal of half of the frequency of the sampling pulses.

With reference to FIG. 1, the line *a* represents, as a function of time, a sinusoidal signal 1 of an amplitude A and a period $1/f$. The instants where this signal reaches its maximum positive and negative amplitudes have been designated $t_{11}$, $t_{12}$, . . . , and the instants of zero value of the signal $t_{21}$, $t_{22}$, $t_{23}$, . . . .

The lines *b* and *c* represent sampling pulses 2 coinciding in time with the maxima and minima of the signal 1 to be sampled, and sampling pulses 3 coinciding in time with the zero points of this same signal. These sampling pulses have a frequency of recurrence of twice the frequency of the modulating signal 1.

The lines *d* and *e* represent respectively the pulses of the lines *b* and *c* modulated by the signal of the line *a* in the case of symmetrical modulation, that is to say, in the case where the modulated pulses are of two polarities.

We know that the modulated pulses of the line *d* contain in their frequency spectrum, a component having the frequency *f* of the modulating signal, and an amplitude proportional to the amplitude A of the modulating signal.

The pulses 5 obtained by modulating the pulses 3 by the signal 1 are all of zero amplitude since at the instants of sampling, the modulating signal is zero.

The wave form diagram of FIG. 1 shows therefore, that to modulate a succession of recurrent sampling pulses by means of an alternating modulating signal whose frequency is equal to half of the frequency of recurrence of the said sampling pulses, it is necessary that the phase of the alternating modulating signal be perfectly defined with relation to the instants of appearance of the sampling pulses. If this condition were met, the component of the pulse modulation spectrum whose frequency is that of the modulating signal, would have a stable value. The said condition therefore requires also that the frequency of the modulating signal be perfectly synchronized with the frequency of recurrence of the sampling pulses.

Figure 2:
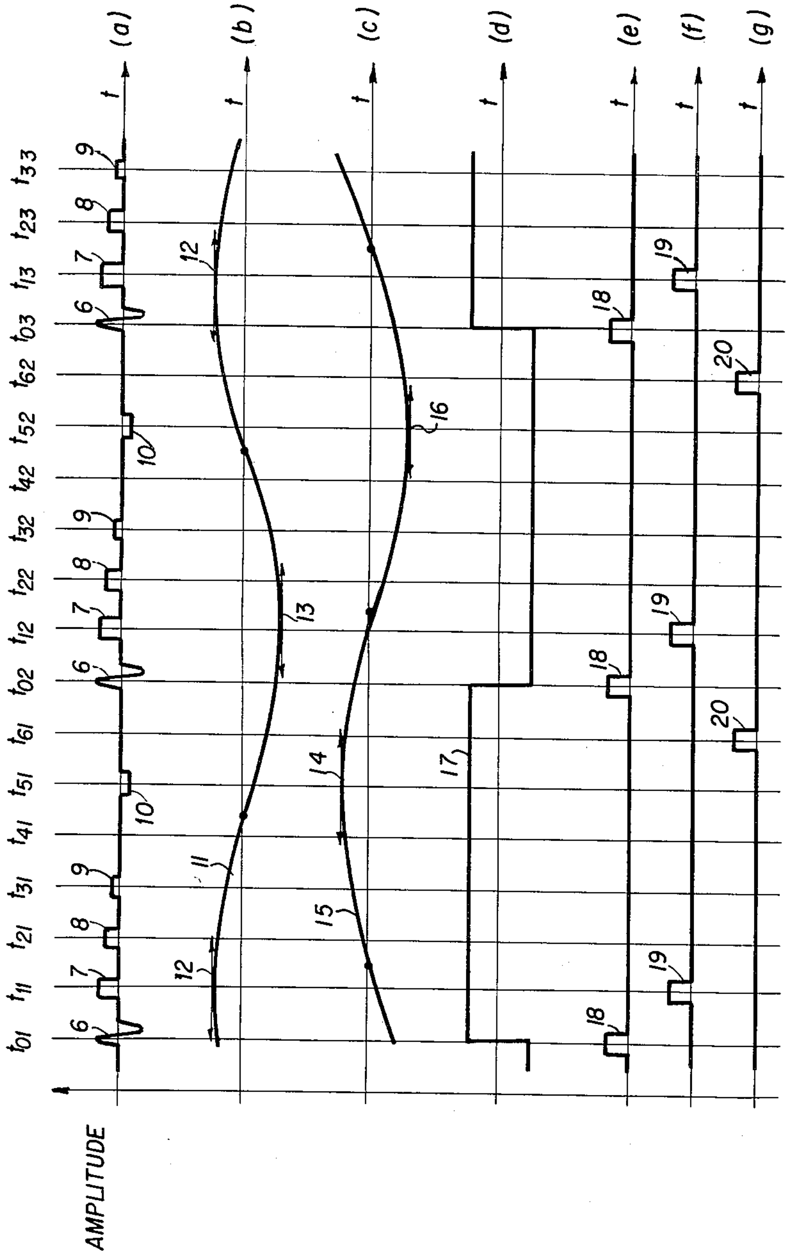
FIG. 2 is a diagram of the signals emitted by six channel multiplex system employing pulse modulation by amplitude, called "symmetrical," with which there has been associated a system for the transmission of control pulses according to the invention; on this FIGURE 2 there is shown, in particular the wave shape of the control pulse according to the invention.

FIG. 2 gives the aspects of the signals emitted by a six channel multiplex telecommunication system utilizing symmetrical amplitude modulation, as described for example in French Patent No. 1,119,205 to the present applicant, and to which has been adjoined a control signal transmission system according to the invention.

In the FIG. 2 the time is indicated as abscissae and the signal amplitudes as ordinates.

On the line *a* there are shown at 6 the synchronization pulses that are produced at the instants $t_{01}$, $t_{02}$, $t_{03}$, . . . and which are symmetrical two directional pulses, at 7 the modulated pulses of the first channel that are produced at the instants $t_{11}$, $t_{12}$, $t_{13}$, . . . , and at 8, 9, and 10 the modulated pulses of the second, third, and fifth channels. The pulses for the channel of the rank *n* are produced at the instants $t_{n1}$, $t_{n2}$, $t_{n3}$, . . . . The channel pulses have at each instant, amplitudes proportional to those of the modulator input signals of the said channels at that same instant.

The control pulse used in this invention is shown at 17 on the line *d*. It is a rectangular pulse of a frequency equal to half the frequency of repetition of the sampling pulses of the system. Its phase is such that it changes polarity at the instants of occurrence of the synchronizing pulses 6 (line *a*) of the multiplex system.

It would be possible to use, in lieu of said rectangular control pulse, a sinusoidal control wave of the same frequency, that is, of a frequency half that of the channel pulses. However, if this were done, such a sinusoidal control wave would have to have a well defined phase relation to the sampling pulse of the channel with which it is to be used, that is, a separate control wave would be required for each channel. For example, as shown in line *b* of FIG. 2, the sinusoidal control wave assumed to be used in connection with the first channel should have the phase represented by sine wave 11 (the maximum 12 and the minimum 13 of the curve 11 coincide in time with the pulses 7). Similarly, as shown in line *c* of FIG. 2, the control wave assumed to be used with the fifth channel would have to have the phase illustrated by sine wave 15 (the maximum 14 and the minimum 16 of the curve 15 coincide in time with the pulses 10). Consequently, if sinusoidal control waves were used, $n$ separate waves of this kind, each phase-displaced with respect to all others, would be needed for an $n$-channel multiplex system.

The phasing of the synchronizing pulse and the sampling pulses is accomplished very simply by producing the control pulse by means of a bi-stable trigger circuit said circuit in turn being controlled by the pulse generator (clock) of the system.

The rectangular pulse received at the output of the trigger circuit is distributed to the control pulse gating devices of the different channels. These gating devices are coincidence circuits which permit the control pulses to pass on to the input of the corresponding channel modulator when they receive a control signal.

Upon reception, the component of the demodulated signal whose frequency is equal to half that of the sampling pulses may be separated from the voice frequency signals by an electric filtering network in order to assure the proper response of the control pulse receiving devices.

FIG. 3 represents a one-line diagram, in block form, of a six channel multiplex transmission system employing symmetrical pulse amplitude modulation, taken as an example, in order to show how it is possible to associate therewith the control signal transmission system of the invention.

Only the equipment relating to a single channel has been shown in FIG. 3.

21 is a pulse generator or clock which furnishes the recurrent pulses 18 shown on the line $e$ of FIG. 2. These pulses are applied to a distribution network 22, which has six outlets $V_1$, $V_2$ . . . $V_6$ which they reach with delays regularly distributed in time. The pulses shown at 19 on the line $f$ of FIG. 2 are received at the outlet $V_1$, while the pulses shown at 20 on the line $g$ of FIG. 2 are received at the outlet $V_6$. The corresponding pulses produced at the intermediate instants $t_{21}$, $t_{31}$, $t_{41}$, $t_{51}$ sharing the time interval $t_{11}$–$t_{61}$ which separates the pulses obtained at $V_1$ and $V_6$, are received at the other outlets $V_2$, $V_3$, $V_4$, $V_5$ at equal time intervals.

These different pulses constitute the sampling pulses for channels I to VI. The electrical circuits which permit the execution of the above mentioned operations are well known in the techniques of pulse modulation equipment.

The pulse generator 21 also feeds the synchronization pulse generator 23, which furnishes to the transmission output terminal 24 of the multiplex equipment, the two-directional pulses 6 produced at the instants $t_{01}$, $t_{02}$, $t_{03}$, . . . and which are shown on line $a$ of FIG. 2. Electric circuits permitting the production of these bi-directional pulses as well as their selection upon reception, are described in the French Patent 1,119,205 already mentioned.

The pulse generator 21 likewise feeds the control pulse generator 25, which may be composed, as previously stated, of a bi-stable electric circuit of the Eccles-Jordan type, similar to those described on pages 164, 165, 166 of the book "Wave Forms," by Chance, Hughes, MacNichol, Sayre and Williams, published by McGraw-Hill Book Co., Inc., New York, 1949.

This bi-stable circuit 25, which receives the recurrent pulses 18 furnished by the generator 21, provides the rectangular pulse 17 at the outlet point 26. This pulse is applied to all of the channel pulse gating devices, only one of which, associated with the first channel, is shown at $27_1$ in FIG. 3. This gating device receives the control signal by way of its terminal $30_1$.

The modulator $28_1$ associated with the first channel, is connected to the outlet $V_1$ of the distribution network 22. This modulator 28 is controlled by the pulses 19 coming from the outlet $V_1$. At its input it may receive either the conversation signal transmitted over channel I and applied to the terminal $29_1$, or the control pulse coming from the control pulse gating device $27_1$, or both the conversation signal and the control pulse at the same time. Consequently, at the instants $t_{11}$, $t_{12}$, $t_{13}$ . . . corresponding to the pulses 19, the modulator $28_1$ furnishes at its outlet (which is connected to the output terminal 24 of the multiplex transmission equipment) pulses such as 7 whose amplitude is proportional to the instantaneous amplitude of the conversation signal, or to that of the control pulse, or to that of the mixture of these two signals.

Modulator circuits corresponding to that shown in FIG. 3 are well known. A possible form of these circuits is described for example, on pages 228 and 229, FIGS. 8–10, of the book "Pulse Techniques," by Moskowitz and Racker, published by Prentice-Hall, Inc., New York, 1951.

FIGURE 4 shows by way of example, the schematic of a control pulse gating device such as shown at $27_1$ in FIG. 3.

The device of FIG. 4 is composed of an electromechanical relay 31 in series with a direct current source 32 having one terminal grounded. Control signals actuate the control pulse gating device $27_1$. These control signals are in the form of ground placed on the terminal $30_1$. The relay 31 has a make contact comprising a fixed contact 33 and a moving contact 34. The control pulse provided by the control pulse generator 25 is applied to the contact 33. The movable contact 34 is connected to the input of the channel modulator $28_1$.

Each time that the relay 31 operates under the action of the control signal, the control pulse is applied to the input of the modulator $28_1$, which pulse thus modulates the pulses of the channel I under consideration with a signal of a frequency having one half the frequency of recurrence of the said pulses, and this modulation may occur at the same time as the possible modulation of the same pulses by a conversation signal applied to the input $29_1$.

The FIGURE 5 shows the schematic of another form of the control pulse gating device $27_1$ (FIG. 3). This other device $27_1$ employs two diodes 35 and 36, which may be germanium crystal diodes.

The control pulse produced by the generator 25 is applied respectively to the diodes 35 and 36 in series with the condensers 37 and 38. The two diode-condenser assemblies thus constituted are connected in parallel.

The diodes 35 and 36 are blocked by the polarizing source 39 which is negative with respect to ground.

The diode 35 is polarized through the resistances 40, 41 and 44, while the diode 36 is polarized through the resistances 42, 43, 47. The two diodes being blocked, the control pulse produced by the generator 25 is not gated to the resistance 44.

The terminal $30_1$ is connected to the junction point 45 of the resistances 40 and 41 on the one hand, and to the junction point 46 of the resistances 42 and 43 on the other hand.

When a positive control signal is applied to the said terminal $30_1$, the negative polarization is suppressed at the diodes 35 and 36, which become unblocked. The control pulse is then gated to the resistance 44, and consequently to the input of the modulator $28_1$.

The resistances 41 and 43 obviate the necessity of fixing the potentials of the points 49 and 50 at ground potential when the control signal is applied to the terminal $30_1$. If the resistances 41 and 43 were omitted, the control signal applied to the terminals of the resistance 47 would be short-circuited at the moment of the application of the control signal to the terminal $30_1$.

Finally, the condenser 48 and the resistance 41 constitute a decoupling cell intended to prevent the passage of the control pulse over the following path: resistance 47, condenser 37, resistance 41, the common points 45 and 46, resistance 43, condenser 38, resistance 44 and ground, when the control signal is not applied.

While the invention has been described for the case where the pulse modulators such as $28_1$ are modulators in amplitude, it should be understood that the invention is applicable to all types of pulse modulation, such as pulse length modulation and pulse time modulation.

What is claimed is:

1. In a time division multiplex communication system, a plurality of intelligence-signal transmitting channels, a plurality of amplitude modulators each having its input connected to one of said channels, said modulators having recurring sampling pulses supplied thereto in relatively displaced time positions each associated with one of said channels, a communication circuit connected to the outputs of said plurality of modulators in common, means for generating a periodic pulse common to said plurality of channels, said common pulse being of rectangular wave form, and having a frequency above the frequency range of said intelligence signals and of a value equal to one-half the repetition rate of said sampling pulses, and means individual to each said channel for gating said common pulse through to the input of the corresponding modulator so that the amplitude of said common pulse is superimposed on the amplitude of said intelligence signal.

2. In a time-division-multiplex communication system, the combination as claimed in claim 1, wherein the first mentioned means generates said common pulse with a phase relation to the sampling pulses such that said control pulse is positive during one cycle of the sampling pulses and is negative during the next following cycle of the sampling pulses, the output of said generating means being supplied to the control pulse gating means of each of said plurality of channels.

3. In a time-division-multiplex communication system, the combination as claimed in claim 2, including means common to said plurality of channels for gating onto said communication circuit a synchronization signal recurring during each cycle at a time different from that of the sampling pulses, the phase of said rectangular control pulse being such that the last-mentioned pulse changes polarity during each cycle at the time of occurrence of said synchronization signal.

4. In a time-division-multiplex telephone system of the symmetrical amplitude modulation type, the combination as claimed in claim 2, wherein there is also supplied to each said control pulse gating means a control signal individual to the corresponding channel, said control pulse gating means including circuit means for gating said rectangular control pulse gated by said control signal, to the corresponding modulator in parallel with the intelligence signal of said channel.

5. In a time-division-multiplex communication system, the combination as claimed in claim 3, including a time clock serving as a prime source for the generation of said sampling pulses and said synchronizing signal, the means for generating said rectangular control pulse generating means also being controlled by said time clock.

References Cited in the file of this patent

UNITED STATES PATENTS

| | | |
|---|---|---|
| 2,423,466 | Peterson | July 8, 1947 |
| 2,523,703 | Larsen et al. | Sept. 26, 1950 |
| 2,616,976 | Staal | Nov. 4, 1952 |
| 2,662,116 | Xavier-Noel Potier | Dec. 8, 1953 |
| 2,861,257 | Weintraub | Mar. 18, 1958 |